United States Patent
Jeon

[19]
[11] Patent Number: 6,018,595
[45] Date of Patent: Jan. 25, 2000

[54] APPARATUS FOR DECODING AN OBJECT CONTOUR FROM A BITSTREAM OF CONTOUR INFORMATION ENCODED USING A CHAIN CODE

[75] Inventor: Byeung-Woo Jeon, Sungnam, Rep. of Korea

[73] Assignee: Samsung Electronics Co., Ltd., Kyungki-do, Rep. of Korea

[21] Appl. No.: 08/890,206

[22] Filed: Jul. 9, 1997

[30] Foreign Application Priority Data

Jul. 9, 1996 [KR] Rep. of Korea ................. 96-27676

[51] Int. Cl.[7] ................... G06K 9/36; G06K 9/46
[52] U.S. Cl. ................ 382/242; 382/233; 382/245
[58] Field of Search ................. 382/242, 243, 382/244, 245, 246, 232, 233; 341/65, 67, 59; 358/427, 261.1; 348/395, 400

[56] References Cited

U.S. PATENT DOCUMENTS

| | | | |
|---|---|---|---|
| 4,777,651 | 10/1988 | McCann et al. | 382/242 |
| 5,007,098 | 4/1991 | Kumagai | 382/242 |
| 5,430,556 | 7/1995 | Ito | 382/246 |
| 5,481,364 | 1/1996 | Ito | 382/233 |
| 5,675,669 | 10/1997 | Kim | 382/242 |
| 5,699,117 | 12/1997 | Uramoto et al. | 348/390 |
| 5,712,928 | 1/1998 | Murayama | 382/242 |
| 5,748,789 | 5/1998 | Lee et al. | 382/243 |
| 5,757,972 | 5/1998 | Murayama | 382/242 |
| 5,768,438 | 6/1998 | Etoh | 382/251 |
| 5,793,371 | 8/1998 | Deering | 382/242 |

FOREIGN PATENT DOCUMENTS

| | | | |
|---|---|---|---|
| 20466/95 | 12/1995 | Australia | H04N 7/28 |
| 0 574 251 A2 | 12/1993 | European Pat. Off. | G06F 15/66 |
| 0 675 460 A2 | 10/1995 | European Pat. Off. | G06T 9/00 |
| 0 682 455 A2 | 11/1995 | European Pat. Off. | H04N 7/50 |
| 7-334686 | 12/1995 | Japan | G06T 9/00 |

*Primary Examiner*—Matthew C. Bella
*Attorney, Agent, or Firm*—Sughrue, Mion, Zinn, Macpeak & Seas, PLLC

[57] ABSTRACT

A contour decoding apparatus decodes a bitstream of contour information which was encoded using a chain code. A demultiplexing unit separates the bitstream of the contour information into start contour pixel information and chain code information. A start contour pixel decoder decodes start contour pixel information separated by the demultiplexing unit and outputs horizontal and vertical coordinate values of the start pixel. A chain code decoding unit stores horizontal and vertical coordinate values of the previous contour pixel, selects an incremental/decremental value designated by the chain code information output from the demultiplexing unit, calculates coordinate values of the next contour pixel using the selected incremental/decremental value and the coordinate values decoded by the start contour pixel decoder or stored previous coordinates values and calculates coordinate values of the next contour pixel using the coordinate values of the previous contour pixel and the incremental/decremental value designated by the chain code information. A contour pixel representation unit displays a value representing a contour pixel at a pixel position designated by the coordinate values decoded by the start contour pixel decoder and the chain code decoding unit.

9 Claims, 5 Drawing Sheets

FIG. 1B  PRIOR ART

▧ CONTOUR PIXELS

FIG. 4

| CHAIN CODE | SW1 | SW2 | SW3 |
|---|---|---|---|
| START CONTOUR PIXEL | 0 | 0 | 0 |
| 0 | 1 | 1 | 0 |
| 1 | 1 | 1 | −1 |
| 2 | 1 | 0 | −1 |
| 3 | 1 | −1 | −1 |
| 4 | 1 | −1 | 0 |
| 5 | 1 | −1 | 1 |
| 6 | 1 | 0 | 1 |
| 7 | 1 | 1 | 1 |

APPARATUS FOR DECODING AN OBJECT CONTOUR FROM A BITSTREAM OF CONTOUR INFORMATION ENCODED USING A CHAIN CODE

BACKGROUND OF THE INVENTION

The present invention relates to a contour decoding apparatus for decoding contour information encoded by a chain code.

A great amount of research and development is directed to digital video and audio service. Particularly, a bidirectional multimedia service using a communication channel is under active development. A digital video service via a bandwidth-limited communication channel requires a high compression rate. It is difficult to obtain such a high compression rate using a block-based motion compensation and transformation coding method such as existing MPEG (Motion Pictures Experts Group)-1 and MPEG-2. Since the encoding method in the existing MPEG-1 and MPEG-2 is based on a block structure of images, it is not easy to perform a flexible and independent encoding of each object or region according to a required compression rate. Thus, it is necessary to divide a given image into objects which can each be independently processed. An independent encoding of each region or object, called "object-based encoding", requires a description of the object shape. The shape information is transmitted to a decoder as contour information.

A chain coding method is known as a general lossless contour information encoding method. The chain coding method represents the contour using eight direction vectors as shown in FIG. 1A. First, the chain coding method selects a location of a starting contour pixel from which to start scanning the contour. Contour pixels are pixels constituting the contour. A chain-coding example is shown in FIG. 1B. Horizontal and vertical coordinate values of the start pixel are transmitted for the start pixel which starts a chain coding. Since the coordinate values of the start pixel occupy a relatively high ratio of transmission amount in case of a medium requiring a low transmission rate, an additional compression is required. Thus, the horizontal and vertical coordinate values of the start pixel are variable-length-coded and transmitted, or any one of the horizontal and vertical coordinate values of the start pixel is independently variable-length-coded and a difference value between the other coordinate value and the independently variable-length-coded coordinate value is variable-length-coded and transmitted.

Therefore, it is important to have an efficient decoding apparatus to decode the compressed starting location and chain codes.

SUMMARY OF THE INVENTION

It is an object of the present invention to provide a decoding apparatus for receiving and decoding object contour information of an image which is encoded using a chain code.

To accomplish the above object of the present invention, there is provided an apparatus for decoding an object contour from a bitstream of contour information encoded using a chain code, the contour decoding apparatus comprising: a demultiplexing unit for separating the bitstream of the contour information into start contour pixel information and chain code information; a start contour pixel decoder for decoding start contour pixel information separated by the demultiplexing unit and outputting horizontal and vertical coordinate values of the start pixel; a chain code decoding unit for storing incremental and decremental values possessed by adjacent pixels in the horizontal or vertical directions therein, selecting an incremental and decremental value designated by the chain code information output from the demultiplexing unit, calculating coordinate values of a next contour pixel using the selected incremental and decremental value and the coordinate values decoded by the start contour pixel decoder, and calculating coordinate values of the next contour pixel using the coordinate values of the previous contour pixel and the incremental and decremental value designated by the chain code information; and a contour pixel representation unit for representing a value representing a contour pixel on a pixel position designated by the coordinate values decoded by the start contour pixel decoder and the chain code decoding unit.

BRIEF DESCRIPTION OF THE DRAWINGS

The present invention will be described in more detail with reference to the accompanying drawing in which:

FIG. 1B is a view showing an example of contour pixels and chain coding;

FIG. 4 is a table diagram showing switching control signals for controlling connecting states of the switches in FIG. 2.

DETAILED DESCRIPTION OF THE PREFERRED EMBODIMENTS

A preferred embodiment of the present invention will be described in detail with reference to the accompanying drawings.

Figure 2:
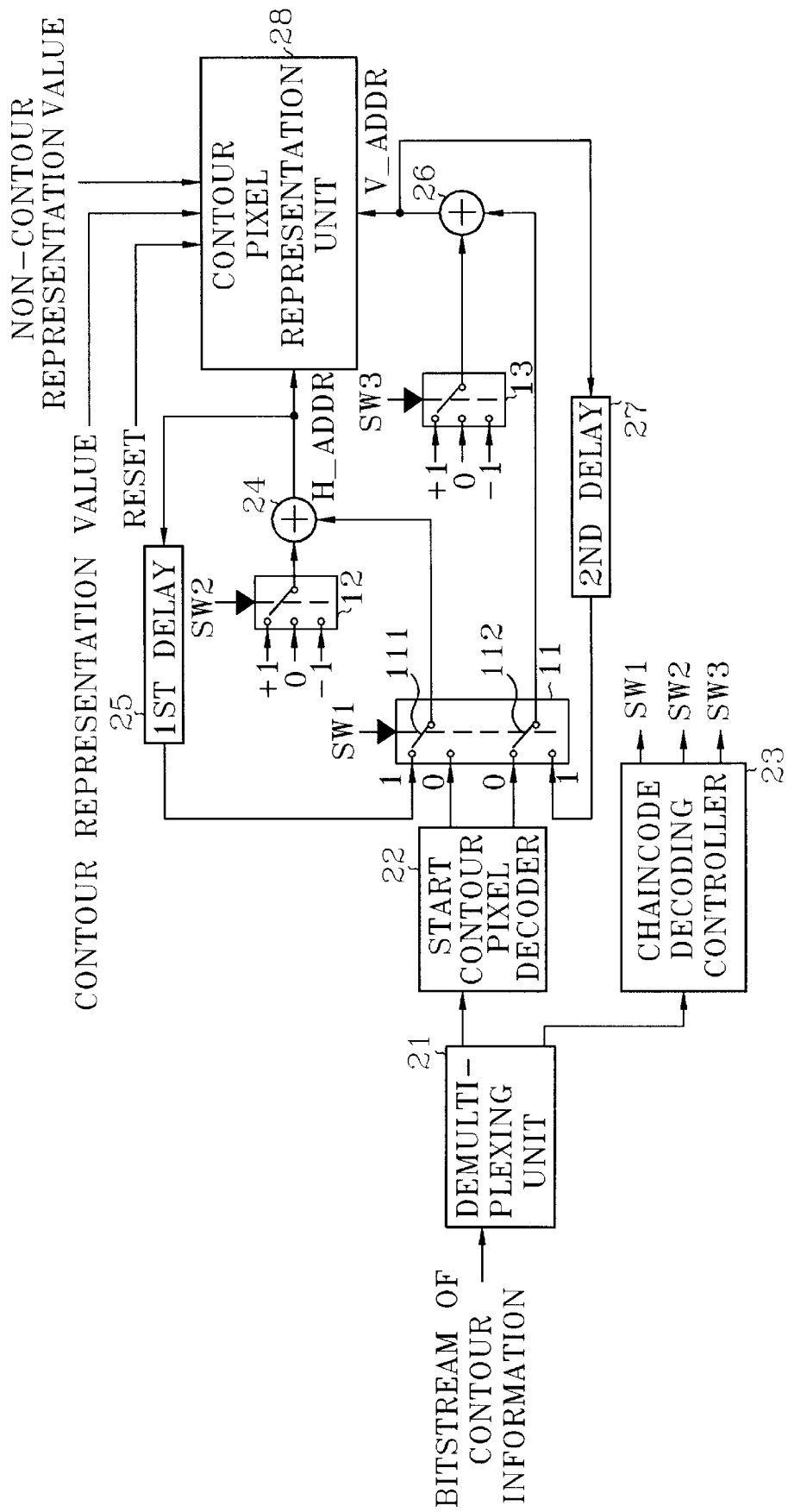
FIG. 2 is a block diagram of a contour decoding apparatus according to a preferred embodiment of the present invention.

In FIG. 2, which shows a contour decoding apparatus according to a preferred embodiment of the present invention, a demultiplexing unit 21 receives a bitstream of the contour information encoded using a chain code. The demultiplexing unit 21 separates the received bitstream into the start contour pixel information and the chain code information and outputs the separated start contour pixel information and chain code information to a start contour pixel decoder 22 and a chain code decoding controller 23, respectively. The start contour pixel decoder 22 receives the start contour pixel information output from the demultiplexing unit 21 and decodes the received start contour pixel information.

Figure 3:
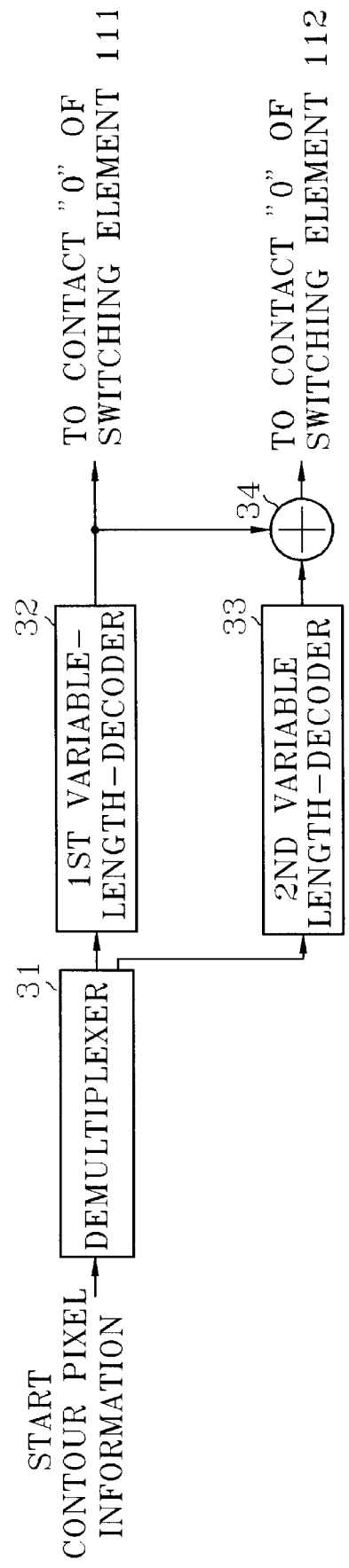
FIG. 3 is a detailed block diagram of the start contour pixel decoder of FIG. 2.

FIG. 3 is a detailed diagram of the start contour pixel decoder 22 shown in FIG. 2. One of horizontal and vertical coordinate values of the start contour pixel is variable length-coded as a reference coordinate value, and a difference value between the other coordinate value and the reference coordinate value is variable-length-coded and transmitted. FIG. 3 shows an example of a case in which a horizontal coordinate value is variable-length-coded into a reference coordinate value.

In FIG. 3, a demultiplexer 31 separates the received start contour pixel information into a reference coordinate value and a difference value. A first variable-length-decoder 32 receives and variable-length-decodes the reference coordinate value separated by the demultiplexer 31. A second variable-length-decoder 33 receives and variable length-decodes a variable-length-coded coordinate difference of the other coordinate and the reference coordinate values. The coordinate value variable-length-decoded by the second variable-length-decoder 33 is added to the decoded reference coordinate value by an adder 34. As a result, a decoded vertical coordinate value is output by the adder 34. Referring back to FIG. 2, the horizontal coordinate value decoded by the first variable-length-decoder 32 and the vertical coordinate value output from the adder 34 are applied to fixed contacts "0" of first and second switching elements 111 and 112 in a first switch 11, respectively.

During the time when the start contour pixel information is decoded, moving contacts of switches 11 through 13 are connected to the fixed contacts "0" according to switching control signals SW1 through SW3 supplied from the chain code decoding controller 23, which will be described below.

The decoded horizontal coordinate value is applied to a contour pixel representation unit 28 via the switching element 111 of the first switch 11 and an adder 24, and the decoded vertical coordinate value is applied to the contour pixel representation unit 28 via the switching element 112 of the first switch 11 and an adder 26. The contour pixel representation unit 28 represents the contour pixels in a frame memory (not shown). The contour pixel representation unit 28 initializes each pixel value in the frame memory by an externally input reset signal prior to decoding the contour information, as a non-contour display value. Thereafter, when the horizontal and vertical coordinate values are applied from the adders 24 and 26 the contour pixel value is represented at the pixel position designated by the applied horizontal and vertical coordinate values.

When decoding of the start contour pixel information is completed, the chain code information decoding starts under the control of the chain code decoding controller 23. In more detail, the coordinate values of the next contour pixels following the starting contour pixel represented by the coordinate values decoded by the start contour pixel decoder 22 are calculated in turn.

Figure 1A:
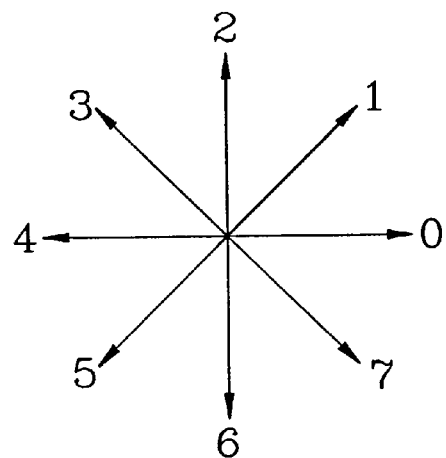
FIG. 1A is a view showing eight direction vectors used for a chain coding.
Figure 1A:
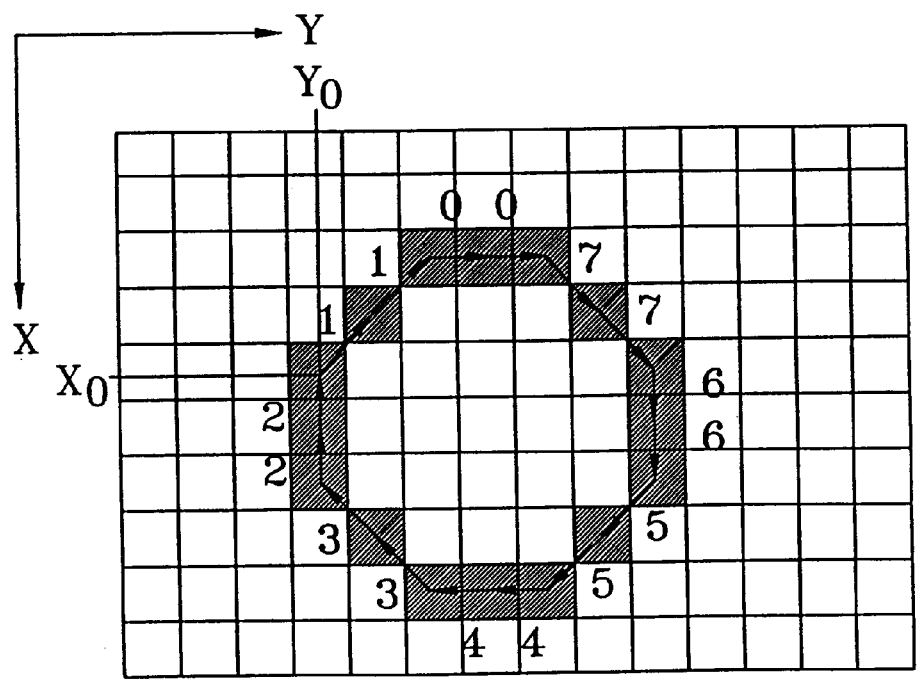

The chain code information, indicating in which direction a current contour pixel is positioned from a previous contour pixel, is determined by the horizontal and vertical codes indicated by each direction vector shown in FIG. 1A. The chain code decoding controller 23 stores the horizontal and vertical codes of each direction vector in the form of a lookup table.

FIG. 4 shows a lookup table containing the horizontal and vertical codes of each direction vector of FIG. 1A. The lookup table of FIG. 4 stores status values of control signals SW1, SW2 and SW3. SW1 is for controlling supply of the coordinates of contour pixels. SW2 and SW3 are for controlling calculations of H_ADDER and V_ADDER according to each direction vector.

Figure 5:
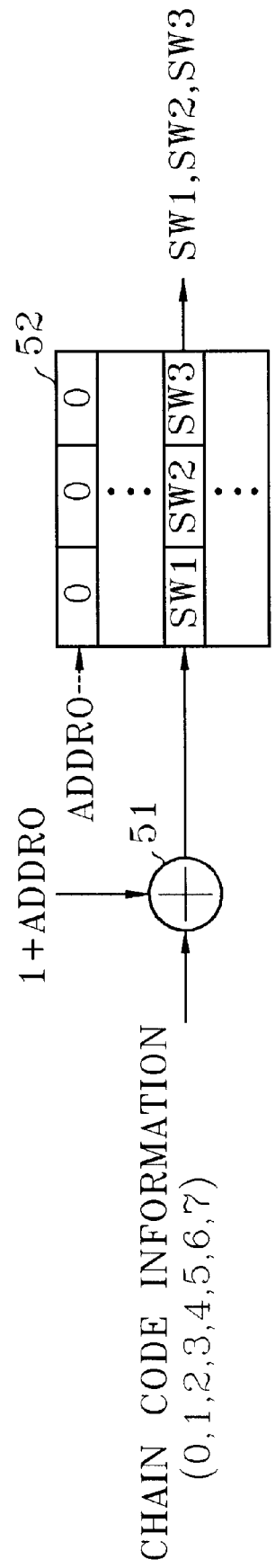
FIG. 5 is a detailed diagram of the chain code decoding controller of FIG. 2.

Referring to FIG. 5 showing a detailed structure of the chain code decoding controller 23 of FIG. 2, the chain code information separated by the demultiplexing unit 21 is added to an address ADDR0-1 by an adder 51. The added result of the adder 51 is used as a read address for the switching control signals SW1 through SW3 stored in the lookup table 52. When the start contour pixel information is decoded, the output of the adder 51 is not used, and instead switching control signals SW1 of "0", SW2 of "O" and SW3 of "0" designated by the address ADDR0 are output. Otherwise, the switching control signals SW1 through SW3 output from the lookup table 52 are supplied to the first through third switches 11 through 13, which are used for controlling the connecting states of the respective switches 11 through 13.

The horizontal and vertical coordinate values of the decoded start pixel are input to first and second delays 25 and 27, respectively. The horizontal and vertical coordinate values of the start contour pixel are delayed by the first and second delays 25 and 27 during the time when the chain code decoding controller 23 operates with respect to the next chain code information. During the time when the chain code information is decoded, the moving contacts of the switching elements 111 and 112 in the first switch 11 are connected to the fixed contacts "1" according to the first switching control signal SW1 supplied from the chain code decoding controller 23. Thus, the coordinate values delayed by the delays 25 and 27 are fed back to the adders 24 and 26 via the switching elements 111 and 112 in the first switch 11, respectively.

The second switch 12 selects one of horizontal positions such as a prior-to-one-pixel position (−1), a current pixel position (0) and an after-one-pixel position (+1) according to the second switching signal SW2 output from the chain code decoding controller 23, to define the horizontal coordinate value of a contour pixel on the basis of the previous contour pixel. The first adder 24 adds the horizontal coordinate value of the fed-back previous contour pixel and the value selected via the second switch 12, and outputs the added result as the horizontal coordinate value H_ADDR of the current contour pixel.

The third switch 13 selects one of vertical positions such as a prior-to one-line position (−1), a current line position (0) and an after-one-line position (+1) according to the third switching signal SW3 output from the chain code decoding controller 23, to define the vertical coordinate value of a contour pixel on the basis of the vertical coordinate value of the previous contour pixel. The second adder 26 adds the vertical coordinate value of the fed-back previous contour pixel and the value selected via the third switch 13, and outputs the added result as the vertical coordinate value V_ADDR of the current contour pixel. The horizontal and vertical coordinate values output from the adders 24 and 26 are applied to the contour pixel display 28 and simultaneously input to the delays 25 and 27 so as to be used for calculating the next contour pixel.

If the horizontal and vertical coordinate values H_ADDR and V_ADDR are input from the adders 24 and 26, the contour pixel display 28 displays the contour pixel value at a pixel position represented by the input horizontal and vertical coordinate values.

The start contour pixel decoder 22 has been described with respect to only the case of decoding coordinate values encoded with a difference between the reference coordinate value and one of the horizontal and vertical coordinate values. It is however obvious that the coordinate values can be individually variable-length-coded within the scope of the present invention.

As described above, the contour decoding apparatus can effectively decode contour information encoded with a chain code.

While only certain embodiments of the invention have been specifically described herein, it will be apparent that numerous modifications may be made thereto without departing from the spirit and scope of the invention. One example is to use differential chain coding instead of chain coding.

What is claimed is:

1. An apparatus for decoding an object contour from a bitstream of contour information encoded using a chain code, the contour decoding apparatus comprising:

a demultiplexing means for separating the bitstream of the contour information into start contour pixel information and chain code information;

a start contour pixel decoder for decoding the start contour pixel information separated by the demultiplexing means and outputting horizontal and vertical coordinate values of the start pixel; and a chain code decoding means for storing horizontal and vertical coordinate values of a previous contour pixel, selecting an incremental/decremental value as indicated by the chain code information output from the demultiplexing means, calculating coordinate values of a next contour pixel using said selected incremental and decremental values and said stored coordinate values, and outputting horizontal and vertical coordinates at which a contour pixel is located.

2. An apparatus for decoding an object contour from a bitstream of contour information encoded using a chain code according to claim 1, the apparatus further comprising:

a contour pixel representation means for displaying a value representing a contour pixel at a pixel location represented by the coordinate values decoded by the start contour pixel decoder and the chain code decoding means.

3. An apparatus for decoding an object contour from a bitstream of contour information encoded using a chain code according to claim 2, wherein said start contour pixel decoder comprises:

a demultiplexer for separating the start contour pixel information into horizontal and vertical coordinate values;

a first variable-length-decoder for variable-length-decoding the horizontal coordinate value separated by the demultiplexer and outputting the result; and a second variable length-decoder for variable-length-decoding the vertical coordinate value separated by the demultiplexer and outputting the result.

4. A contour decoding apparatus according to claim 1, wherein said start contour pixel decoder comprises:

a demultiplexer for separating the start contour pixel information into a reference value and a difference value which is relative to the reference value;

a first variable-length-decoder for variable-length-decoding the reference value separated by the demultiplexer and outputting the result as a first coordinate value;

a second variable-length-decoder for variable-length-decoding the difference value separated by the demultiplexer and outputting the result; and an adder for adding the outputs from said first and second variable-length-decoders and outputting the added result as a second coordinate value.

5. The contour decoding apparatus according to claim 4, wherein said reference coordinate value is a horizontal coordinate value.

6. The contour decoding apparatus according to claim 4, wherein said reference coordinate value is a vertical coordinate value.

7. The contour decoding apparatus according to claim 1, wherein said chain code decoding means stores the incremental/decremental values in a lookup table.

8. The contour decoding apparatus according to claim 1, wherein said chain code decoding means comprises:

a first switch for selecting between the horizontal and vertical coordinate values of a previous contour pixel and the horizontal and vertical coordinate values of the starting contour pixel and for outputting the selected horizontal and vertical coordinate values;

a first delay for delaying the horizontal coordinate value of a previous contour pixel;

a second switch for selecting a value representing horizontal position adjustment from among a decremented-pixel position (−1), a current pixel position (0) and an incremented-pixel position (+1) according to the selected incremental/decremental value;

a first adder for adding the horizontal coordinate value output from said first switch and the value selected by said second switch;

a second delay for delaying the vertical coordinate value of the previous contour pixel;

a third switch for selecting one of values representing vertical position adjustment such as a decremented-line position (−1), a current line position (0) and an incremented-line position (+1) according to the selected incremental and decremental value; and a second adder for adding the vertical coordinate value output from said first switch and the value selected by said third switch.

9. The contour decoding apparatus according to claim 8, wherein said second and third switches in the chain code decoding means select "O" when the coordinates of the start contour pixel are supplied to said first and second adders.

* * * * *